US012726292B2

(12) United States Patent
Pei et al.

(10) Patent No.: US 12,726,292 B2
(45) Date of Patent: Sep. 1, 2026

(54) PARALLELIZED OPTICAL LINK CALIBRATION OVER AN OPTICAL SECTION

(71) Applicant: Ciena Corporation, Hanover, MD (US)

(72) Inventors: Yinqing Pei, Kanata (CA); Alex W. MacKay, Ottawa (CA); David W. Boertjes, Nepean (CA)

(73) Assignee: Ciena Corporation, Hanover, MD (US)

(*) Notice: Subject to any disclaimer, the term of this patent is extended or adjusted under 35 U.S.C. 154(b) by 378 days.

(21) Appl. No.: 18/537,177

(22) Filed: Dec. 12, 2023

(65) Prior Publication Data

US 2025/0192909 A1 Jun. 12, 2025

(51) Int. Cl.
*H04J 14/02* (2006.01)
*H04B 10/2507* (2013.01)

(52) U.S. Cl.
CPC ...... *H04J 14/0202* (2013.01); *H04B 10/2507* (2013.01)

(58) Field of Classification Search
None
See application file for complete search history.

(56) References Cited

U.S. PATENT DOCUMENTS 5,239,607 A 8/1993 da Silva et al.
5,677,781 A 10/1997 Mori et al.
6,031,647 A 2/2000 Roberts
6,222,668 B1 * 4/2001 Dutrisac ........... H04B 10/2971 359/337
6,304,347 B1 10/2001 Beine et al.
6,515,777 B1 2/2003 Arnold
6,798,567 B2 9/2004 Feldman et al.
6,907,201 B1 6/2005 Frankel
6,959,149 B2 10/2005 Bragg et al.
7,450,288 B2 * 11/2008 Kikuchi ............ H04B 10/5051 359/239
7,483,205 B1 1/2009 Lundquist et al.
8,064,770 B2 11/2011 Manna
(Continued)

FOREIGN PATENT DOCUMENTS

EP 2 993 806 A1 9/2016

OTHER PUBLICATIONS

A. Melloni et al., Frequency characterization of the nonlinear refractive index in optical fiber, Jan. 1999, pp. 1-11.
(Continued)

*Primary Examiner* — Darren E Wolf
(74) *Attorney, Agent, or Firm* — Baratta Law PLLC; Lawrence A. Baratta, Jr.

(57) ABSTRACT

A method of parallelized optical link calibration of an optical section having a plurality of spans interconnecting a transmit Optical Add/Drop Multiplexer (OADM) with a receive OADM via a plurality of line amplifiers includes partitioning the optical section into a plurality of sub-sections, each including one or more spans of the plurality of spans; utilizing equipment at the plurality of line amplifiers to isolate the plurality of sub-sections from one another; and performing measurements of spans for the parallelized optical link calibration in some or all of the plurality of sub-sections at a same time. Advantageously, timing of the parallelized optical link calibration is independent of a number of spans in the optical section.

20 Claims, 8 Drawing Sheets

(56) References Cited

U.S. PATENT DOCUMENTS

| | | | | |
|---|---|---|---|---|
| 8,509,621 | B2 | 8/2013 | Boertjes et al. | |
| 8,909,038 | B2 | 12/2014 | Cannon et al. | |
| 8,971,705 | B2 | 3/2015 | Boertjes et al. | |
| 9,197,322 | B2 | 11/2015 | Boertjes et al. | |
| 9,252,913 | B2 | 2/2016 | Al Sayeed et al. | |
| 9,276,696 | B2 | 3/2016 | Al Sayeed et al. | |
| 9,344,191 | B2 | 5/2016 | Al Sayeed et al. | |
| 9,344,193 | B2 | 5/2016 | Boertjes et al. | |
| 9,419,708 | B2 | 8/2016 | Rad et al. | |
| 9,577,763 | B2 | 2/2017 | Al Sayeed et al. | |
| 9,680,569 | B2 | 6/2017 | Archambault et al. | |
| 9,755,776 | B2 | 9/2017 | Boertjes et al. | |
| 9,768,902 | B2 | 9/2017 | Al Sayeed et al. | |
| 9,847,831 | B2 | 12/2017 | Archambault et al. | |
| 9,906,294 | B2 | 2/2018 | Al Sayeed et al. | |
| 9,973,295 | B2 | 5/2018 | Al Sayeed et al. | |
| 9,985,726 | B1 | 5/2018 | Al Sayeed et al. | |
| 10,142,022 | B1 | 11/2018 | Harley et al. | |
| 10,161,798 | B2 | 12/2018 | Pei et al. | |
| 10,200,145 | B2 | 2/2019 | Boertjes et al. | |
| 10,361,957 | B1 | 7/2019 | MacKay et al. | |
| 10,439,709 | B1 | 10/2019 | Al Sayeed | |
| 2001/0004290 | A1* | 6/2001 | Lee | H04J 14/0305 398/79 |
| 2002/0109906 | A1 | 8/2002 | Grubb et al. | |
| 2002/0118440 | A1 | 8/2002 | Lin et al. | |
| 2003/0185563 | A1 | 10/2003 | Stephens et al. | |
| 2004/0028406 | A1* | 2/2004 | Bortz | H04Q 11/0005 398/49 |
| 2004/0075889 | A1* | 4/2004 | Shin | H04B 10/506 359/341.1 |
| 2005/0024715 | A1 | 2/2005 | Inoue et al. | |
| 2005/0152693 | A1 | 7/2005 | Grand et al. | |
| 2005/0185263 | A1 | 8/2005 | Lee et al. | |
| 2008/0304829 | A1 | 12/2008 | Sato | |
| 2009/0214215 | A1 | 8/2009 | Li et al. | |
| 2010/0158532 | A1 | 6/2010 | Goto et al. | |
| 2013/0058647 | A1 | 3/2013 | Boertjes et al. | |
| 2014/0160919 | A1 | 6/2014 | Kar et al. | |
| 2015/0085350 | A1 | 3/2015 | Griseri et al. | |
| 2015/0117858 | A1 | 4/2015 | Al Sayeed et al. | |
| 2015/0132009 | A1 | 5/2015 | Yuki et al. | |
| 2018/0069648 | A1 | 3/2018 | Inada | |
| 2018/0262292 | A1 | 9/2018 | Dangui et al. | |
| 2018/0343077 | A1 | 11/2018 | Al Sayeed et al. | |
| 2018/0343078 | A1 | 11/2018 | Roberts et al. | |
| 2019/0007156 | A1 | 1/2019 | Rad et al. | |
| 2019/0103939 | A1 | 4/2019 | Al Sayeed et al. | |
| 2019/0253361 | A1 | 8/2019 | Mackay et al. | |
| 2020/0313380 | A1* | 10/2020 | Pei | H01S 3/06779 |
| 2024/0178630 | A1* | 5/2024 | Walasik | H01S 3/1618 |

OTHER PUBLICATIONS

Agilent Technologies, Agilent 86038B Photonic Dispersion and Loss Analyzer User's Guide, Second Edition, Jul. 2006, pp. 1-350.

M. Ohashi, Intech, Fiber Measurement Technique Based on OTDR, Chapter 19, 2013, pp. 512-539.

X. Bao et al., sensors ISSN 1424-8220, Recent Progress in Brillouin Scattering Based Fiber Sensors, Sensors 2011, 11, 4152-4187; doi:10.3390/s110404152, Published Apr. 7, 2011, pp. 4153-4187.

E.M. Dianov et al., Applied Physics B, Long-Range Interaction of Picosecond Solitons Through Excitation of Acoustic Waves in Optical Fibers, Appl. Phys. B 54, 1992, pp. 175-180.

R. Hui et al., Journal of Lightwave Technology, Characterization of Electrostriction Nonlinearity in a Standard Single-Mode Fiber Based on Coherent Detection and Cross-Phased Modulation, IEEE, 0733-8724, 2015, pp. 1-7.

Dorrer, "Characterization of chromatic dispersion using gated amplified spontaneous emission", Optical Fiber Communication Conference, IEEE, Feb. 23, 2004, pp. 1-3.

Nicholson et al., "Characterization of higher-order-mode content in large-mode-area fibers", Lasers and Electro-Optics, IEEE, May 4, 2008, OSA/CLEO/QELS, pp. 1-2.

Aug. 3, 2020, International Search Report and Written Opinion for International Application No. PCT/US2020/025177.

Feb. 27, 2020 International Search Report and Written Opinion for International Patent Application No. PCT/US2019/060392.

* cited by examiner

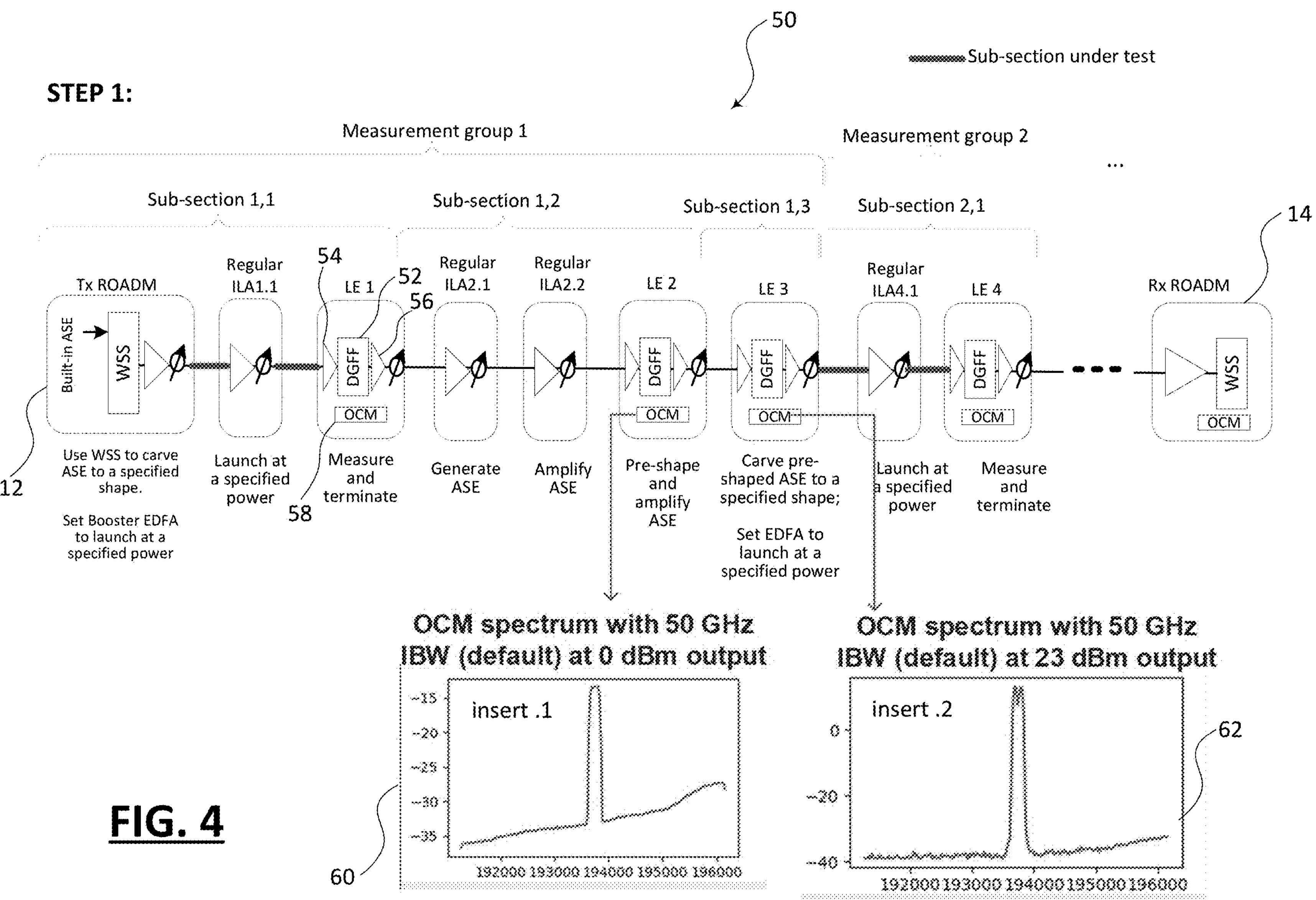

STEP 1:
50
Sub-section under test
Measurement group 1
Measurement group 2
...
Sub-section 1,1
Sub-section 1,2
Sub-section 1,3
Sub-section 2,1
Tx ROADM
Built-in ASE
WSS
Regular ILA1.1
54
LE 1
52
56
DGFF
OCM
Regular ILA2.1
Regular ILA2.2
LE 2
DGFF
OCM
LE 3
DGFF
OCM
Regular ILA4.1
LE 4
DGFF
OCM
Rx ROADM
14
WSS
OCM
12
Use WSS to carve ASE to a specified shape.
Set Booster EDFA to launch at a specified power
Launch at a specified power
58
Measure and terminate
Generate ASE
Amplify ASE
Pre-shape and amplify ASE
Carve pre-shaped ASE to a specified shape;
Set EDFA to launch at a specified power
Launch at a specified power
Measure and terminate
OCM spectrum with 50 GHz IBW (default) at 0 dBm output
insert .1
-15
-20
-25
-30
-35
192000 193000 194000 195000 196000
60
OCM spectrum with 50 GHz IBW (default) at 23 dBm output
insert .2
0
-20
-40
192000 193000 194000 195000 196000
62
FIG. 4

PARALLELIZED OPTICAL LINK CALIBRATION OVER AN OPTICAL SECTION

FIELD OF THE DISCLOSURE

The present disclosure relates generally to optical networking. More particularly, the present disclosure relates to systems and methods for parallelized optical link calibration over an optical section, e.g., an Optical Multiplex Section (OMS).

BACKGROUND OF THE DISCLOSURE

In an optical network, an OMS is an all-optical section between Optical Add/Drop Multiplexers (OADMs), i.e., between optical multiplexers and demultiplexers. As described herein, the term optical section is used to refer to an OMS, optical link between terminals, etc. In a typical network, there can be one or more Intermediate Line Amplifiers (ILAs) between the OADMs, waveshaping (e.g., Dynamic Gain Flattening Filters (DGFF) and the like) at some or all of the ILAs, and Raman amplification, in an optical section. For achieving proper system performance and operation, there is a need to perform optical link calibration which generally includes making measurements in the optical section. These measurements can include invasive measurement to determine fiber characteristics, so-called Fiber Characterization (FC) to measure optical fiber dispersion, nonlinear coefficients, or other fiber parameters. These measurements can also include a determination of proper actuator settings in the optical section, such as Raman gain calibration to determine pump powers, Erbium Doped Fiber Amplifier (EDFA) gain settings, Variable Optical Attenuator (VOA) settings, and the like. As described herein, these measurements can all be referred to as optical link calibration.

BRIEF SUMMARY OF THE DISCLOSURE

The present disclosure relates to systems and methods for parallelized optical link calibration over an optical section. Again, optical link calibration is critical to achieve proper system configurations. Conventionally, optical link calibration is done sequentially, span by span within an OMS because a stable and known spectrum is required into each span under test (SUT) or device under test (DUT), where a span may include one or more optical fibers and in a general definition may also include devices such as amplifiers or other optical line elements within a span. By performing the actions sequentially, the calibration procedure achieves targets and measurements required on a given DUT or SUT, and then proceeds to the next element to take required measurements and run required calibration procedures until it stabilizes and then continues. This works fine with a small number of spans (e.g., 6-10 or less). However, the problem with the sequential operation, is that it scales very poorly as the number of spans in an OMS increases, as is being observed in real systems (e.g., some deployments are seeing ~60 span OMSs and the calibration time increases linearly with span count). Of note, the terms “optical link calibration” and “measurements” may be used interchangeably and those skilled in the art will recognize “optical link calibration” is the overall process whereas “measurements” is what is used to perform the “optical link calibration.” That is, measurements are a key aspect of optical link calibration to determine exact, measured properties of optical fiber and the associated optical line system. The present disclosure addresses how to perform such measurements for parallelized optical link calibration over an optical section.

To solve this issue, we propose dividing an OMS into sub-sections and interleaving calibration between sets of subsections which can be completely isolated using existing equipment, thus solving the stable spectral requirements, enabling parallelized link calibration to dramatically reduce overall time. Of note, some OMS deployments are using waveshaping at ILAs which enables approximately 60 spans and the approach described herein can result in a calibration time improvement of ~20× (from hours to minutes). That is, the approach described herein enables a constant calibration time regardless of span count after a certain number of spans depending on architecture choices of implementation. In another embodiment, some calibration and measurement procedures utilize shaped amplified spontaneous emission (ASE), and these approaches can benefit from increased signal-to-noise ratio (SNR) in their measurements due to the ability to re-generate spectral characteristics, of the shaped ASE, within a sub-section. This can enable these applications to expand beyond what was originally possible due to the ability to re-generate high SNR signals for new measurements.

In an embodiment, a method of parallelized optical link calibration of an optical section having a plurality of spans interconnecting a transmit Optical Add/Drop Multiplexer (OADM) with a receive OADM via a plurality of line amplifiers is described. The method includes steps of partitioning the optical section into a plurality of sub-sections, each including one or more spans of the plurality of spans; utilizing equipment at the plurality of line amplifiers to isolate the plurality of sub-sections from one another; and performing measurements of spans for the parallelized optical link calibration in some or all of the plurality of sub-sections at a same time. An overall time to complete the parallelized optical link calibration is independent of a number of the plurality of spans. The performing measurements are isolated in associated sub-sections without impacting other sub-sections. The equipment at the plurality of line amplifiers to isolate the plurality of sub-sections can include a Variable Optical Attenuator (VOA) and/or an optical amplifier which is configured to perform isolation.

The performing measurements can include generating amplified spontaneous emission (ASE) in a current sub-section or in an upstream sub-section and measuring received ASE in the current sub-section. The generating ASE can be via one of an Erbium Doped Fiber Amplifier (EDFA), a semiconductor optical amplifier (SOA), or a Raman amplifier. The generating ASE can be via a first line amplifier having a first optical amplifier configured to create full-band ASE and a second line amplifier having a second optical amplifier configured to launch the full-band ASE at a specified power and tilt. The generating ASE can include full-band ASE for calibrations using full-band ASE without a specific shape requirement. The generating ASE can include generating the ASE and spectrally shaping the ASE via a waveshaping device for calibrations with specific spectral shape requirements where, at an end of the current sub-section, an Optical Channel Monitor (OCM) is configured to detect a change in the spectral shape. The measuring can be via one of a Raman amplifier and an Optical Channel Monitor (OCM).

In another embodiment, an optical line system includes a transmit Optical Add/Drop Multiplexer (OADM); a receive OADM; and a plurality of line amplifiers located between the transmit OADM and the receive OADM, each line amplifier of the plurality of line amplifiers including an optical amplifier; wherein the transmit OADM, the plurality of line amplifiers, and the receive OADM form an optical section having a plurality of spans, and wherein the transmit OADM, the plurality of line amplifiers, and the receive OADM are partitioned in a plurality of sub-sections each including one or more spans of the plurality of spans for parallelized optical link calibration that includes utilization of equipment at the plurality of line amplifiers to isolate the plurality of sub-sections from one another, and measurements of spans for the parallelized optical link calibration in some or all of the plurality of the plurality of sub-sections at a same time.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 4 to 6 are network diagrams of an optical line system with an optical section for illustrating parallelized optical calibration with shaped spectrum as an input to each SUT or DUT.

DETAILED DESCRIPTION OF THE DISCLOSURE

Figure 1:
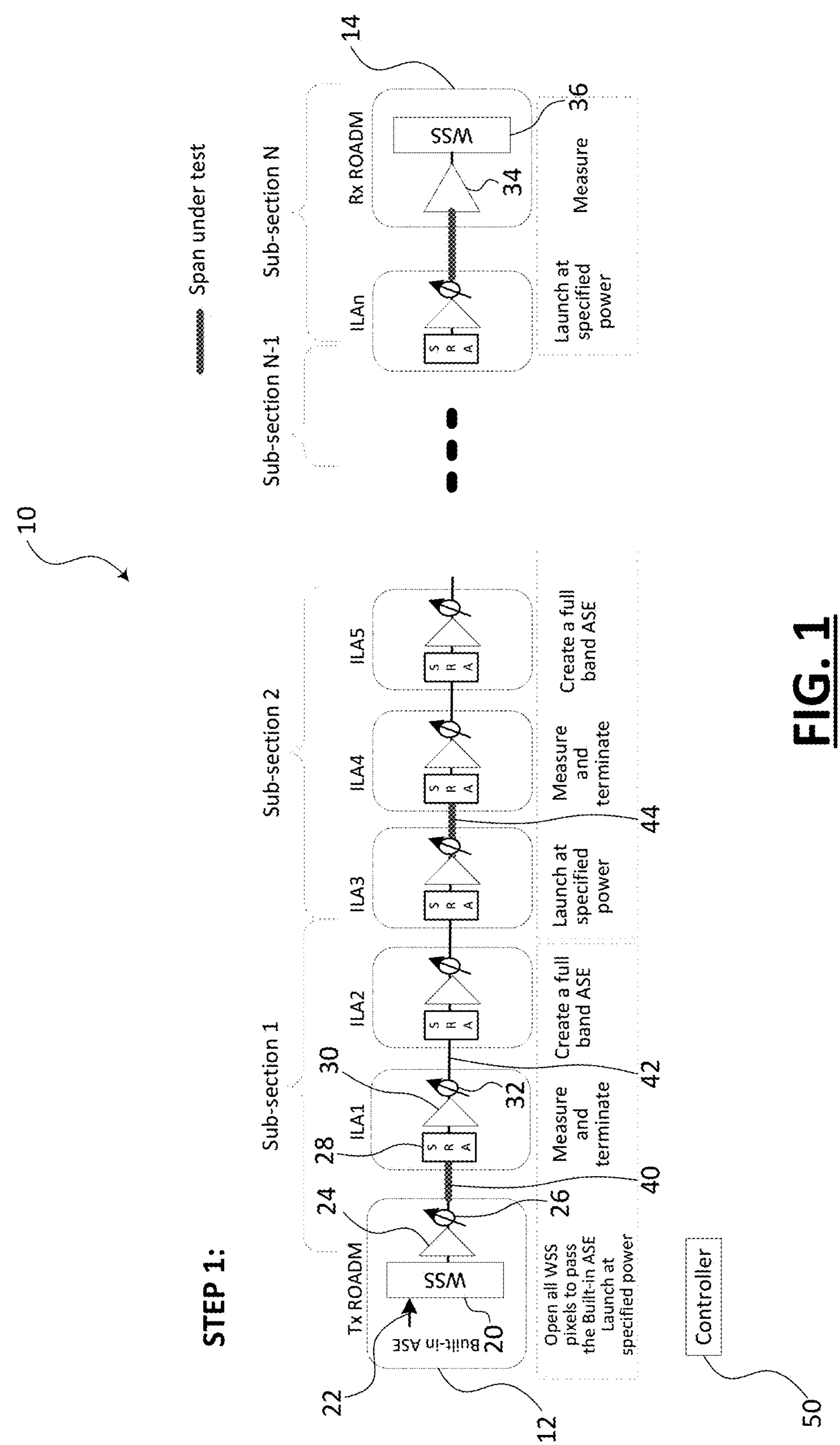
FIGS. 1 to 3 are network diagrams of an optical line system with an optical section for illustrating parallelized optical calibration with full band spectrum as an input to each span under test (SUT) or device under test (DUT).

Again, the present disclosure relates to systems and methods for parallelized optical link calibration over an optical section. The parallelized optical link calibration supports measurements and calibration of multiple spans in the same optical section at the same time. Two examples of optical link calibration include:

(1) Measurements to determine equipment settings for proper operation, e.g., transmitter launch powers, Raman amplifier pump settings, amplifier gain or gain tilt settings, loss actuator settings, and the like, and (2) Measurements for characterizing optical fiber or other devices, such as to determine dispersion and nonlinearity.

The present disclosure contemplates use in both these types of optical link calibration. Again, the term optical link calibration is meant to cover any process that requires stable input power into a device or span such that span-by-span or device-by-device measurements are typically employed in the optical section calibration, and the present disclosure presents approaches to parallelize these measurements to improve overall calibration time.

An example of measurements to determine equipment settings for proper operation is described in U.S. Pat. No. 10,547,404, issued Jan. 28, 2020, and entitled "Automatic optical link calibration with channel holders," the contents of which are incorporated by reference. U.S. Pat. No. 10,547,404 describes finding optimal photonic parameters such as optimal launch power profile to fiber, amplifier gain-blocks (also known gain switch modes), and all gain/loss actuator settings over an optical section using ASE-based channel holders. The measurements described here are on a span-by-span or device-by-device sequential basis. The present disclosure includes simultaneous generation of new independent full band spectrums as calibration sources at different spans in the same optical section, by terminating signals from upstream and using one or more ILA(s) to generate and amplify a new full band spectrum. Of note, these functions are performed using existing equipment in the optical section.

An example of measurements for characterizing optical fiber is described in U.S. Pat. No. 11,799,546, issued Oct. 24, 2023, and entitled "Optical fiber characterization using a nonlinear skirt measurement," the contents of which are incorporated by reference. U.S. Pat. No. 11,799,546 describes characterizing fiber dispersion and nonlinearity based on the spectral shape of an ASE signal. For example, an ASE source can be shaped by a Wavelength Selective Switch (WSS) at a transmit (Tx) Reconfigurable Optical Add/Drop Multiplexer (ROADM), and, at a corresponding receive (Rx) ROADM, after propagation over a span under test, the nonlinear product can be characterized by analyzing the changes in the spectral shape of the ASE signal, i.e., there is a mathematical relationship between the transmitted shape and the received shaped that can be backed out to determine dispersion and nonlinear parameters, as described in U.S. Pat. No. 11,799,546. Of note, this approach is useful to provide in-situ measurement of unknown fiber characteristics, providing actual results versus calculated or assumed results, and this in-situ measurement leverages existing equipment associated with an optical lines system, i.e., no external test equipment. However, there is a limit to this measurement as SNR degrades, making measurements of the shaped ASE difficult after a certain number of spans. To address this issue, the present disclosure also enables simultaneous generation of new independent shaped ASE as calibration sources at different sub-sections in an OMS. This is enabled by terminating the signal from upstream and using the one or more ILA(s) to generate a full band spectrum along with using one or more spectral shaping devices to achieve the specified spectral shape.

The measurements to determine equipment settings, and some fiber characterization measurements are performed sequentially, span-by-span or device-by-device. Some of the measurements for characterizing optical fiber are also limited to a certain number of spans and devices, beyond which the SNR degrades so that the measurement is ineffective. The present disclosure addresses both these issues with parallelized optical link calibration over an optical section. To remove the dependency to upstream spans, the present disclosure divides a traditional OMS into sub-sections, where spectrums are re-generated and terminated in one or several sub-sections. This allows the calibration to be isolated within a sub-set of the sub-sections within a section.

There can be two example use cases to be considered when dividing the sub-sections, corresponding to the (1) measurements to determine equipment settings for proper operation, and (2) measurements for characterizing optical fiber. Here, the (1) measurements to determine equipment settings for proper operation require a full band spectrum as input, and the (2) measurements for characterizing optical fiber require shaped spectrum as input.

Those skilled in the art will recognize the techniques for parallelized optical calibration are similar for these two example use cases. Namely, VOAs or amplifiers are used to isolate a sub-section from upstream by blocking optical transmission, and amplifiers are used to generate spectrum for testing the isolated sub-section. A difference includes amplifiers with waveshaping components may be used to shape the spectrum, for the (2) measurements for characterizing optical fiber. With such isolation, it is possible to perform measurements in parallel, in an interleaved manner, namely where spans in different sub-sections are measured at the same time with adjacent spans in between. That is, interleaved as described herein means at least two spans are being measured at the same time (meaning simultaneously, concurrently, or simply that their measurement times overlap at some point, i.e., the same time does not necessarily require an exact start and stop at the same moment in time) where the two spans have at least one intermediate span between them without optical power propagating on those intermediate spans, so the spans or devices under test are isolated. That is, interleaved as used herein means there is some alternating or mixing of spans in the same optical section that are measured at some point together.

The foregoing describes examples of this approach with reference to these two example use cases, but those skilled in the art will appreciate other measurements consistent with the techniques described herein are also contemplated. In particular, the present disclosure does not describe the exact details of the measurements themselves. Examples of how the measurements are performed are described in U.S. Pat. Nos. 11,799,546 and 10,547,404, both incorporated above. Rather, the present disclosure focuses on how to parallelize these or any other measurements within an optical section.

The advantages of the parallelized optical link calibration include:

For both the (1) measurements to determine equipment settings for proper operation and the (2) measurements for characterizing optical fiber, the parallelized optical link calibration improves overall time, namely the conventional process's time is correlated to the number of spans, i.e., the more spans, the more time, and with the approach described herein, the overall time is fixed regardless of the number of spans, i.e., the interleaving and parallelized calibration enables measurement that does not vary with span count, that is a deterministic amount.

For the (2) measurements for characterizing optical fiber, the shaped ASE measurement approach, where the shaped ASE can be re-generated every one or several sub-sections to avoid SNR degradation due to amplifier linear noise. This enables the (2) measurements on arbitrarily high span count OMSs. The parallelized optical link calibration also can be performed in an interleaved manner, enabling multiple sub-sections to be characterized at the same time.

For both the (1) measurements to determine equipment settings for proper operation and the (2) measurements for characterizing optical fiber, the independent calibration source generation and measurement within one or several sub-sections enable calibration of a sub-set of sub-sections without impacting the other sub-sections in the entire section.

(1) Measurements to Determine Equipment Settings for Proper Operation

Figure 2:
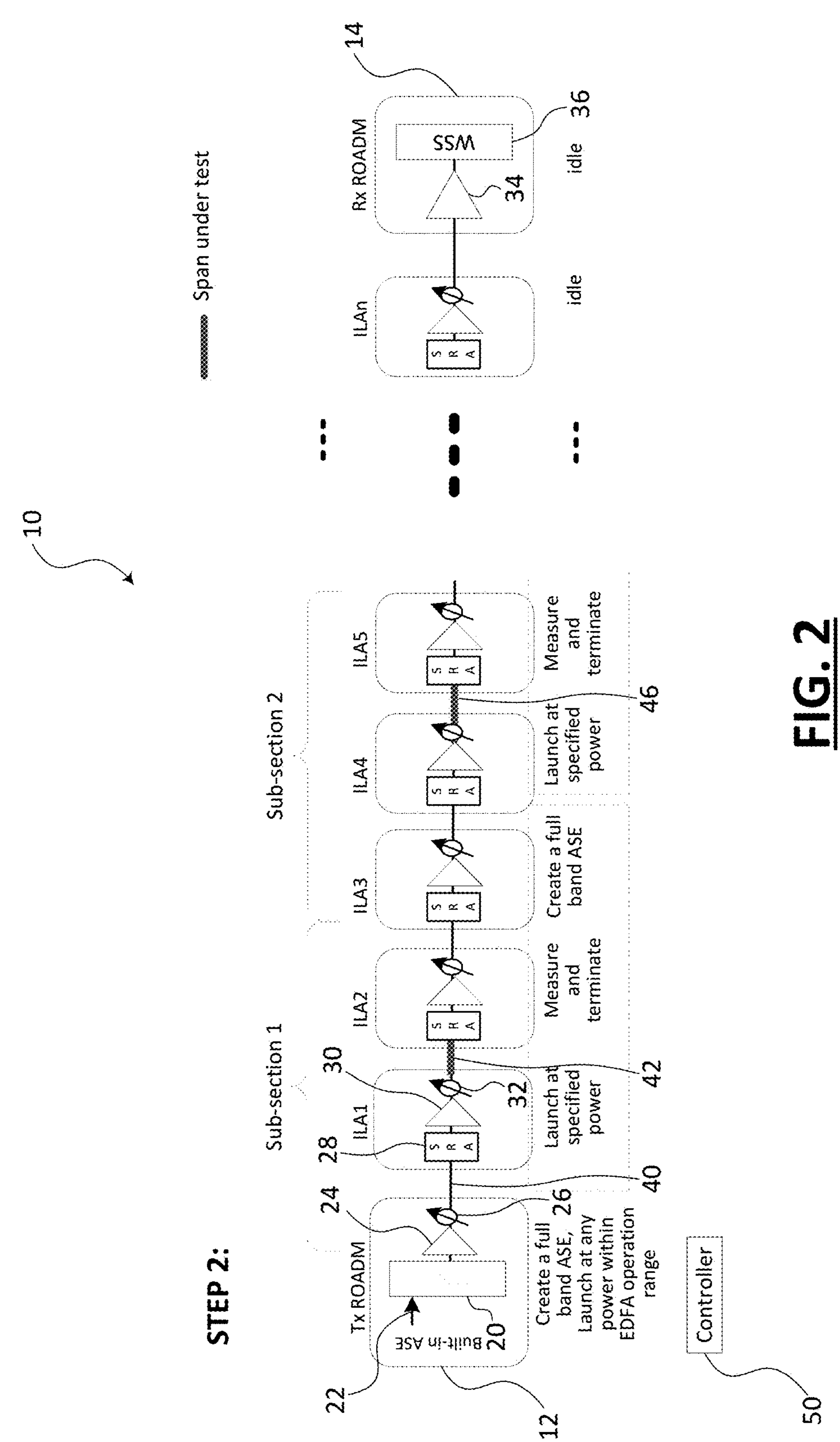
Figure 3:
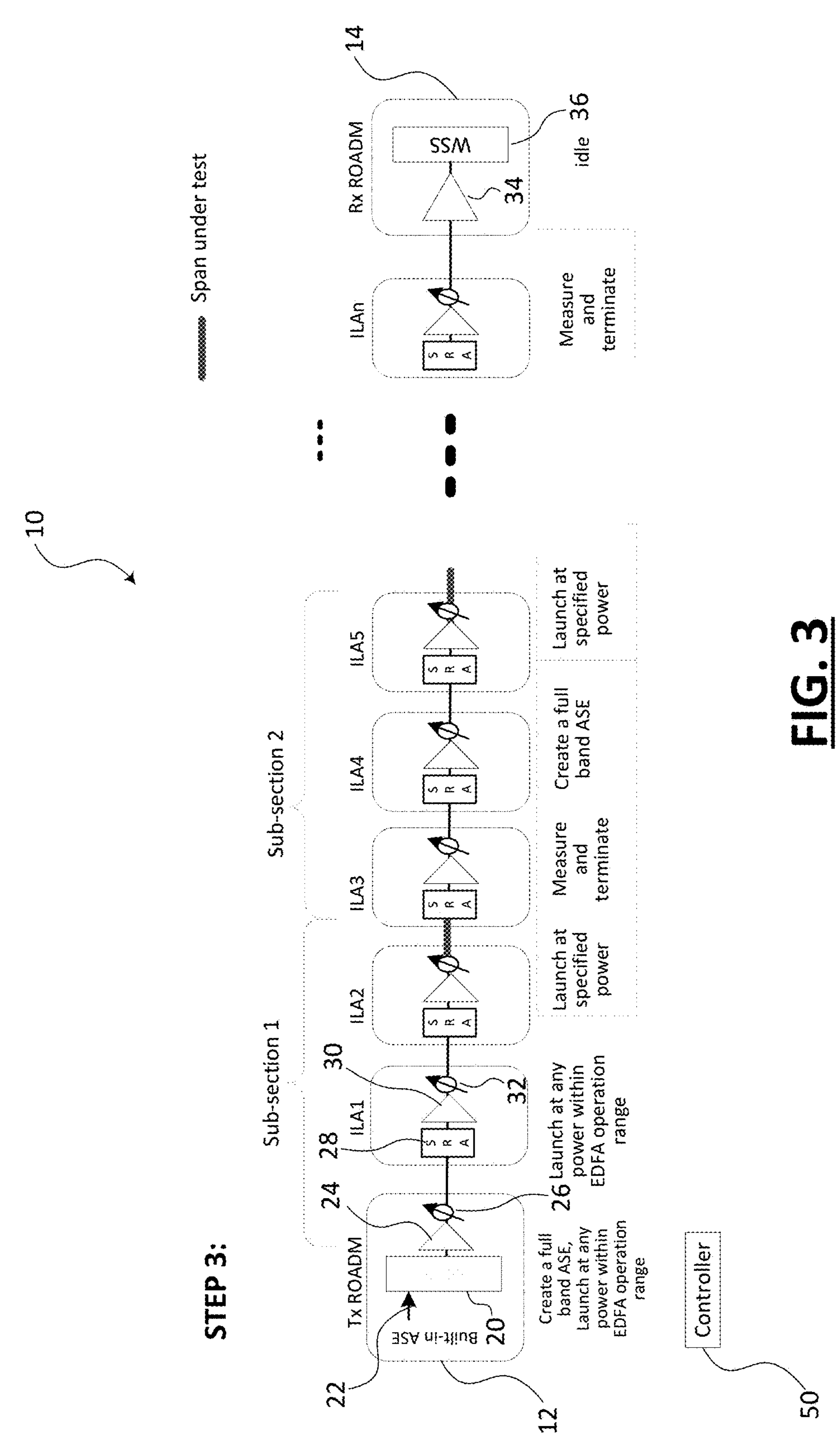

FIGS. 1 to 3 are network diagrams of an optical line system 10 with an optical section for illustrating parallelized optical calibration with full band spectrum as an input to each SUT or DUT. For illustration purposes, the optical line system 10 is shown on a single fiber (unidirectional) from a Tx Reconfigurable Optical Add/Drop Multiplexer (ROADM) 12 to a Rx ROADM 14 with multiple Intermediate Line Amplifiers (ILA) ILA1-ILAn (n being an integer). Of course, a practical implementational will include a second fiber for bidirectional communication, namely a corresponding Tx ROADM at the Rx ROADM 14 site and a corresponding Rx ROADM at the Tx ROADM 12 site. Optical calibration is performed on a single fiber basis, from the Tx ROADM 12 through the ILAs ILA1-ILAn to the Rx ROADM 14. Those skilled in the art will appreciate a practical implementation will also include other equipment (e.g., modems, multiplexer/demultiplexers, Optical Channel Monitors (OCMs), etc.) which are omitted for simplicity of illustration. In the following discussions we will often assume erbium-doped fiber amplifiers (EDFAs) as the primary optical amplifier, but those skilled in the art will appreciate that these techniques could similarly be achieved with other types of optical amplifiers (e.g. semiconductor optical amplifiers, Raman amplifiers, etc.).

The Tx ROADM 16 includes a Wavelength Selective Switch (WSS) 20 configured to selectively add/drop/express channels onto the optical section, i.e., the WSS 20 forms a degree from the Tx ROADM 16 to interface the optical section. The WSS 20 can be connected to an ASE source 22 which can be configured to provide channel holders, i.e., dummy channels, used to channel load unequipped spectrum, so that the overall optical spectrum is constantly full regardless of the number of equipped traffic-carrying channels. After the WSS 20, the Tx ROADM 22 includes a booster amplifier 24 and a VOA 26. Each ILA ILA1-ILAn includes a Raman amplifier 28, a line amplifier 30, and a VOA 32 (note, the Raman amplifier 28 and the VOA may each be optional). The Rx ROADM 14 includes a preamplifier 34 and a WSS 36. The booster amplifier 24, line amplifier 24, and the preamplifier 34 can be EDFA-based amplifiers. The Raman amplifier 28 can be a counter-propagating Raman amplifier.

In the optical line system 10, the objective of the parallelized optical link calibration is for Raman gain calibration and similar operations. The input of this type of calibration requires power over the entire signal band for calibration, and in some cases may not have stringent spectral shape requirements (e.g., for Raman Gain calibration, having the correct total band power is critical, but some shape variation would be tolerable for calibration). Therefore, a full band ASE spectrum generated by EDFA-based amplifiers or the ASE source 22 is sufficient as the calibration signal source to the SUT/DUT. In addition, since the measurement can be done at the Rx of the SUT/DUT, the signal can be terminated after the measurement point in the SUT/DUT.

To support parallelized optical link calibration, the optical section is partitioned into a plurality of optical sub-sections, or simple sub-sections, 1, 2, . . . , N−1, N. The equipment in the optical line system 10 can be configured to isolate the sub-sections 1, 2, . . . , N−1, N. With each sub-section 1, 2, . . . , N−1, N isolated by terminating the sub-section output transmission: a new, independent full band ASE spectrum is generated and amplified/shaped if needed using one or more downstream line amplifiers 30 to provide input to the next sub-section.

FIGS. 1 to 3 illustrate an example of how this may be achieved: a first EDFA with no input power will be set in power mode to generate a relatively flat ASE source, then following EDFAs are used to amplify the ASE source to a target power that meet the calibration requirement (in less shape-stringent cases a single EDFA could be used to generate the ASE at appropriate total power without trying to achieve a target flatness or tilt). As described herein, EDFA is used interchangeably with the line amplifier 30. In FIGS. 1 to 3, two EDFAs are used, namely one to generate relatively flat ASE, and the second to generate correct power and tilt, and FIGS. 1 to 3 illustrate the sub-section division and parallelized calibration interleaving in each step (of three steps) in this use case. In these examples, the output VOAs 32 are shown to terminate a sub-section's spectral propagation, namely, to isolate one sub-section from adjacent sub-sections. Of note, the VOAs 32 are typically available in standard optical line system equipment, thus they are repurposed for performing these parallelize optical link calibration measurements. In another embodiment, the termination/isolation could be achieved via shutting down pumps in the amplifier 30 and/or using a mid-stage VOA (not shown) therein. Additionally, the Tx ROADM 12 is shown with the ASE source 22 built-in, but this could also be achieved by operating the booster amplifier 24 as well to provide ASE output.

FIGS. 1 to 3 illustrate an example embodiment where there are three spans in each sub-section 1, 2, . . . , N−1, N. Note, if the total number of spans in the optical section is not divisible by 3, the last sub-section N can have less than 3 spans, as illustrated in FIG. 1, where the last sub-section N has only 1 span. Those skilled in the art will recognize there can be other values to partition the sub-sections consistent with the teachings described herein, e.g., two spans, four spans, etc., and the choice of three spans is presented merely for illustrative purposes. In this example, there will be three steps to fully characterize each sub-section, starting with the first SUT in step one, the second SUT in step two, and the third in step three. Existing equipment in the optical line system 10 is configured to pass full-band ASE or generate full-band ASE, so that the next ILA can launch the ASE at a specified power, and the next ILA can measure and terminate the ASE.

In FIG. 1, the first sub-section 1 starts at the Tx ROADM 12. The WSS 20 pixels in the Tx ROADM are configured to pass built-in full band ASE, from the ASE source 22, and the booster amplifier 24 is configured to a specified launch power for the calibration of the $1^{st}$ SUT, span 40. The next node, ILA1, at the Rx side of the SUT will measure the full band ASE to feedback to a calibration controller 50 to achieve a calibration target. For example, the ILA1 can include an OCM or similar capable of measuring the received full band ASE over the span 40. The calibration controller 50 can be a processing device that is in-skin (i.e., integrated into a network element at the Tx ROADM 12) as well as an external controller (e.g., network management system, etc.).

Then the spectral power is terminated after the measurement point on the ILA1. Using Raman gain calibration as an example, the calibration controller 50 target is to achieve a specified Raman gain, and the measurement is done in the Raman amplifier 28 before the line amplifier 30. Therefore, signal termination can be done by turning off the EDFA at ILA1. If the calibration measurement involves the EDFA in ILA1, the termination can be done by blocking the output VOA 32 in ILA1 (and, if the VOA 32 is unavailable, the boundaries of the sub-section could move to more than 3 spans).

At this point, ILA2 will have no input power from a span 42, such that it can be configured as a power source to generate a new full band ASE spectrum as the source for calibrating the next sub-section 2. In this example, we then use ILA3 to amplify and possibly tilt the spectrum generated by ILA2 (not necessary for all types of calibration) which then serves as input to the next SUT (span 44). This same process continues for each group of three spans is repeated until the end of the optical section, so that calibrations can be achieved in parallel on each interleaved subsection (in this example, every $3^{rd}$ span). Since the full band ASE sources in each sub-section can be independently controlled and measured, calibration of all SUTs in this step can be done in parallel.

FIG. 2 shows step two in the calibration procedure, where the SUT's are moved by one span, to the span 42 and a span 46, toward the end of the section. Since the first span 40 in the section is not under test in this step, the launch power of the Tx ROADM 12 can be set to any power within the EDFA operation range to pass the full band ASE to the ILA1. The launch power in the ILA1 is set to a specified target to meet the calibration need for the SUT following ILA1, based on the previous step. Then the full band ASE signal is measured and terminated at ILA2 to allow a new independent ASE source generated by the downstream ILA nodes. As in step 1, the same operation will be repeated until the end of the section and all SUT's in each sub-section can be calibrated in parallel.

Similarly, FIG. 3 shows step three in the calibration procedure, where the SUT's are moved by one span toward the end of the section from step two. Again, thanks to the independently generated and measured full band ASE sources in each subsection, all SUT's in each sub-section can be calibrated in parallel.

With the proposed measurement procedure, the calibration can be done in two or more steps, as described above regardless of the total number of spans in the section. Again, the example of FIGS. 1 to 3 shows three steps where we used two EDFAs for generating and amplifying/shaping power, but this could be done on a single EDFA. This procedure will greatly improve the calibration timing and scalability from the conventional span-by-span or device-by-device sequential calibration procedure.

Figure 5:
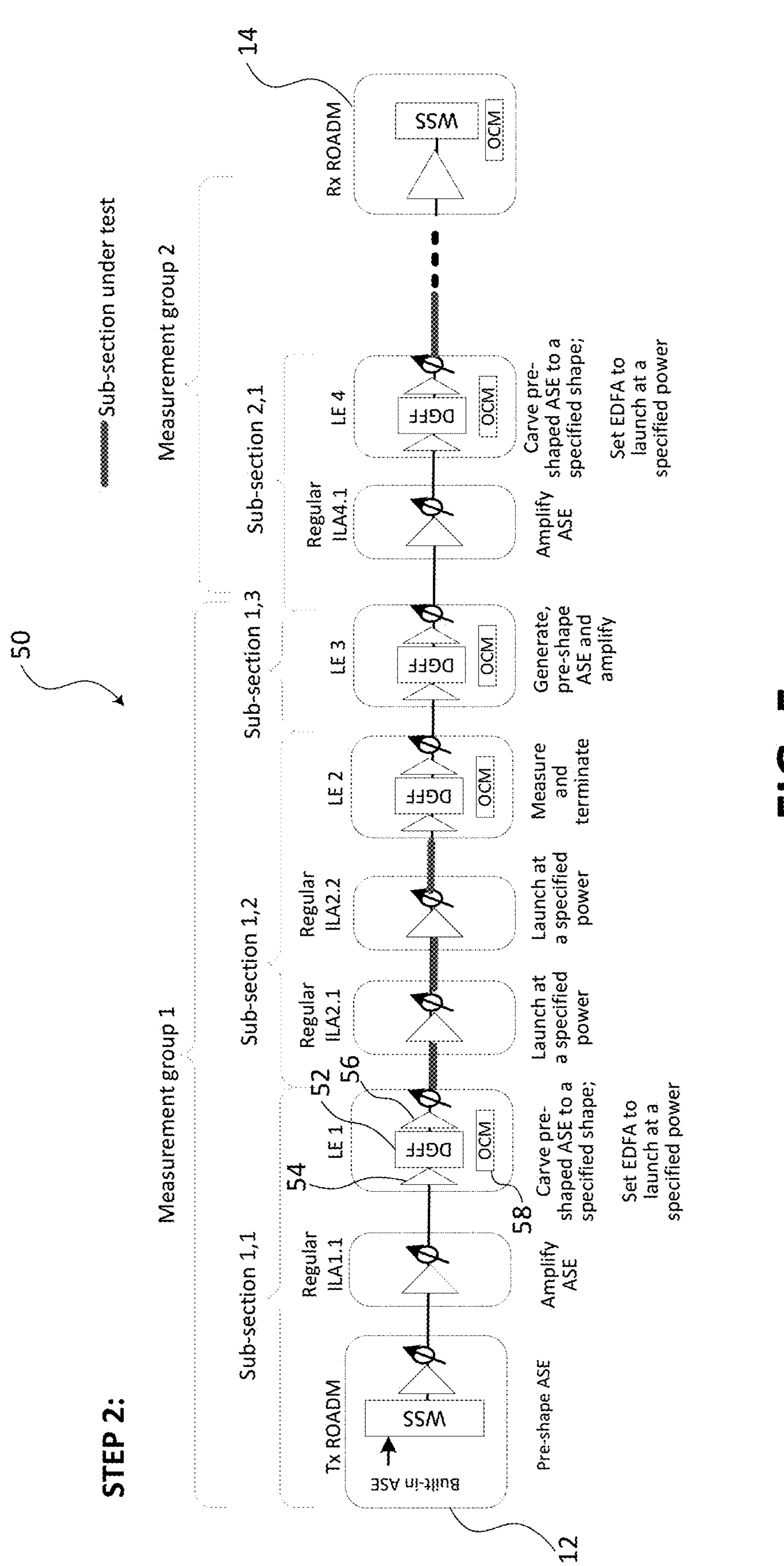
Figure 6:
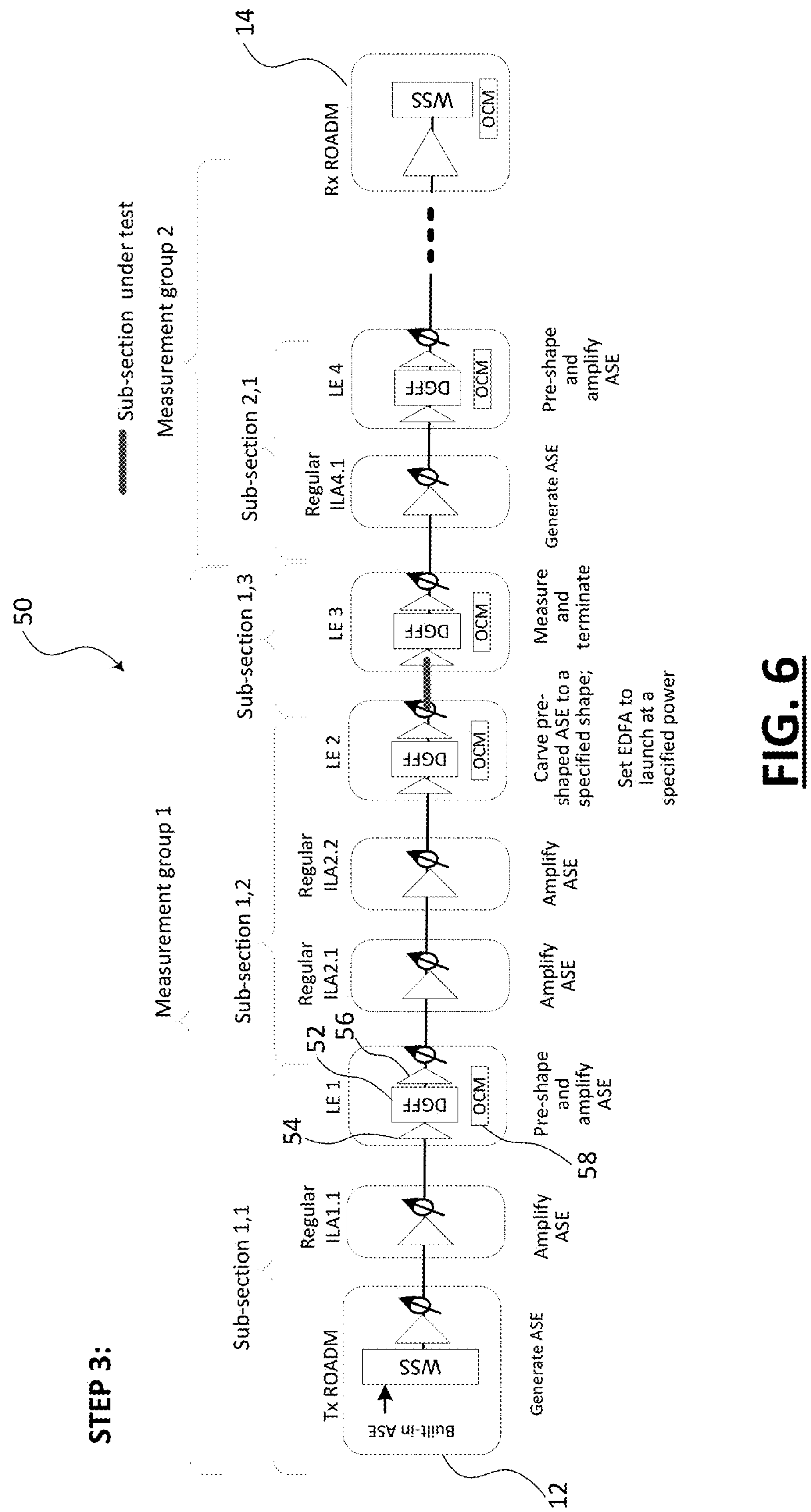

(2) Measurement for Characterizing Optical Fiber,

FIGS. 4 to 6 are network diagrams of an optical line system 50 with an optical section for illustrating parallelized optical calibration with shaped spectrum as an input to each SUT or DUT. The optical line system 50 includes similar components as the optical line system 10, including the Tx ROADM 12 and the RX ROADM 14. The differences are in the line amplifier sites. The optical line system 50 includes so-called regular ILAs ILA1.1, 2.1, 2.2, 4.1, etc. which are similar to the ILAs ILA1-ILAn in the optical line system 10. The optical line system 50 also includes so called LE line amplifier sites LE1-LE4 where LE stands for line equalizer. The LE line amplifier sites provide similar functionality as the ILAs with additional capabilities for waveshaping via a Dynamic Gain Flattening Filter (DGFF) 52 located inline at amplifiers 54, 56 at the LE sites, for signal spectral shaping, and an OCM 58, for spectral shape monitoring.

The present disclosure contemplates use of the waveshaping functionality at the LE line amplifier sites for automatic fiber characterization (AFC) (again, details of this are described in U.S. Pat. No. 11,799,546, previously incorporated) and similar procedures which may require more stringently shaped probe spectrums. The input signal of this type of calibration requires a specified shape, for example a stringently flattened ASE signal or a shaped ASE signal such as a two-peak signal required in AFC measurement. Also, a high-resolution OCM 58 is required to measure the spectral shape after transmission.

Therefore, to enable parallelized calibration, the sub-sections need to be divided by the ILA nodes with signal shaping devices and OCMs, i.e., the LE line amplifier sites. Such nodes are commonly deployed within long sections in optical line systems. The LE line amplifier sites are usually deployed in every one to several spans (e.g., every four spans) to reduce spectral shape distortions. This use case is similar to the previous one, where independent ASE sources are generated and measured within different sub-sections, but subsection divisions require shaping ILAs such as LE line amplifiers.

FIGS. 4 to 6 illustrate an example of the sub-section division and calibration steps. In FIG. 4, the entire section is divided into sub-sections by LE line amplifier sites with the DGFF 52 and OCM 58. There could be zero to several regular ILA nodes (i.e., amplifier nodes without DGFFs and OCMs) within each sub-section, that is, there is no requirement for spacing the LE line amplifiers. FIGS. 4 to 6 show the internal structure of the LE line amplifier, where the DGFF 52 is placed between the 2 EDFA stages, though a similar approach could trivially follow on varying architectures of waveshaping ILAs. That is, the hardware configuration described herein is for illustrative purposes and practical embodiments could use different approaches to achieve similar functionality.

In normal system operation, the DGFF 52 and the OCM 58 are used for flattening signal spectrum. In this disclosure, we take advantage of its spectral shaping and measurement capability for creating and measuring independent calibration signal sources to enable parallelized calibration. The OCM 58 measures input spectrum before the $1^{st}$ EDFA stage and output spectrum after the $2^{nd}$ EDFA stage. In particular, FIG. 4 includes graphs 60, 62 showing two measurements from the OCMs 58, namely the graph 60 shows a first LE 2 pre-shaping and amplifying ASE and the graph 62 shows a second LE 3 carving the pre-shaped ASE to a specified shape.

Of note, this measurement process does not necessarily go span by span, but rather from shaped ASE source to receiver. Again, the parallelization of this measurement allows extension of the AFC and similar measurements beyond an SNR-limited number of spans since the ASE is regenerated and shaped in the optical section, not only at the headend Tx ROADM 12. As such, the number of sub-sections and thus supported span or device count within an OMS can be arbitrary.

The sub-sections illustrated in the example in FIG. 4~6 are grouped into measurement groups with 3 sub-sections per measurement group, though the number of sub-sections per measurement group can be 2 or higher in general. In FIG. 4, in the first step, the first sub-section in each measurement group, i.e., sub-sections 1,1 and 2,1, are calibrated. The first sub-section 1,1 starts at the Tx ROADM 12, where the built-in full band ASE is shaped by the WSS and amplified by the booster amplifier to a specified power required for calibrating the $1^{st}$ span. Then the following regular ILA node(s) are all configured to launch at specified powers until the signal arrives at the LE 1 line amplifier at the end of the first sub-section, where the signal spectral shape is measured by the OCM 58. Note, calibration within a sub-section may need to be done sequentially to calibrate one span at a time, but we are parallelizing operation across sub-sections.

After a control target is measured by the OCM 58 in the LE at the tail end of the sub-section, the signal is terminated by shutting off the EDFA or blocking the output VOA in the same LE line amplifier. Therefore, in the next sub-section, a new independent ASE signal can be generated. As shown in sub-section 1,2 in FIG. 4, a new ASE is generated by the regular ILA nodes and passed to the LE 2 at the tail end of the sub-section. Here, we can take advantage of the DGFF 52 to pre-shape the ASE source to achieve a better quality of the calibration source signal. The two graphs 60, 62 show an example of the pre-shaped and shaped two-peak ASE signal as the calibration source in AFC. The calibration source signal has a bandwidth of 150 GHz. For this application, the SNR of the two-peak signal needs to be as high as possible. Therefore, we can use the DGFF 52 in the LE 2 to create a 200 GHz ASE blob in the pre-shaping. Such that the out-of-band ASE is blocked, and power can be concentrated around the target 2-peak signal frequency, as shown in the graph 60. The pre-shaped ASE will be passed to the L 3E at the end of the sub-section 1,3, to be further carved into the specified shape and to be launched at a specified power for calibrating the spans in sub-section 2,1.

As the example shown in the graph 62, the two-peak signal generated by this approach has excellent (>50 dB) SNR at the maximum EDFA output power (23 dBm). For less stringent required applications, this could again be achieved by two sub-sections interleaving instead of three as shown here. The same operation for each measurement group of three sub-sections are repeated until the end of the section. Calibration can be performed in parallel in the sub-sections under test thanks to the independent generation and measurement of the shaped ASE signal.

FIG. 5 shows step two in the calibration procedure, where the sub-sections under test are moved by one sub-section toward the end of the section, i.e., to the second sub-section within each measurement group. Since sub-section 1,1 is no longer under test, it will be used for creating the calibration source signal to calibrate sub-section 1,2, where the pre-shaping of the ASE is done in the Tx ROADM, and the final shaping and launching is done in the LE at the tail end of sub-section 1,1. Also note, when the sub-section under test is followed by a sub-section with only 1 span and no regular ILA (such as sub-section 1,3), the LE in this sub-section will be configured to generate a broadband ASE in the $1^{st}$ stage of the EDFA, and the ASE will pre-shaped and amplified in the DGFF and the $2^{nd}$ EDFA stage, respectively. FIG. 6 shows step three in the calibration procedure, where the sub-sections under test are further moved by one sub-section toward the end of the section. With these 3 steps, all sub-sections can be calibrated regardless of the total number of spans or sub-sections in the entire section.

Timing

Figures 7A, 7B:
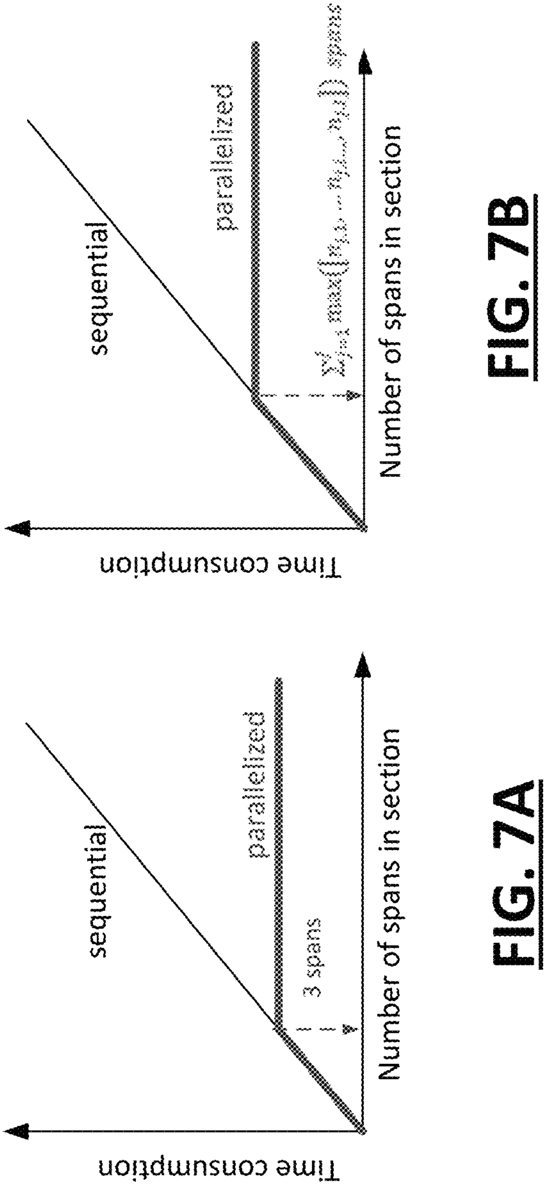
FIGS. 7A and 7B are graphs of time versus number of spans illustrating the timing advantage of the parallelized optical link calibration.

Again, timing of the current sequential calibration procedure increases as the total number of spans in a section. For example, when there are 60 span sections in an OMS deployed in the field, it will take a long time to finish calibration of these long sections. In contrast, the parallelized calibration will have a cap of the calibration time. FIGS. 7A and 7B are graphs of time versus number of spans illustrating the timing advantage of the parallelized optical link calibration.

FIG. 7A illustrates the timing comparison between the sequential and parallelized calibration for the first use case. The timing of parallelized calibration of sections with any number of spans is capped at the time consumption of calibrating three spans with sequential calibration. FIG. 7B illustrates the timing comparison between the sequential and parallelized calibration for the second use case. The timing of parallelized calibration of sections with any number of spans is capped at the time consumption expressed by the following equation (neglecting some small overhead for communication time to coordinate the events):

$$TimeConsumption_{usecase\#2} = T * \sum_{j=1}^{J} \max([n_{j,1}, \ldots n_{j,i} \ldots, n_{j,I}])$$

Where T represents the average time consumption to calibrate one span. $n_{j,i}$ is the number of spans in sub-section j of measurement group i. j=1~J, where J is the total number of sub-sections in each measurement group. The example illustrates in FIG. 4~6 has 3 sub-sections per measurement group, therefore J=3. i=1~I, where I is the total number of measurement groups in the section.

Partial Section Calibration

The limitation of the current calibration procedure is the dependency of the signal generated from section head (Tx ROADM) and the operations of all upstream spans before the SUT. Therefore, the calibration must always be a full section operation even if only one span in the section needs to be calibrated. With the proposed calibration procedure, where the calibration signal source is generated and measured within several sub-sections, operation to calibrate a part of the section can be isolated within these several sub-sections. It not only saves time but also saves the comms and operation complexity in the system to co-ordinate the nodes in the section.

Parallelized Optical Link Calibration Process

Figure 8:
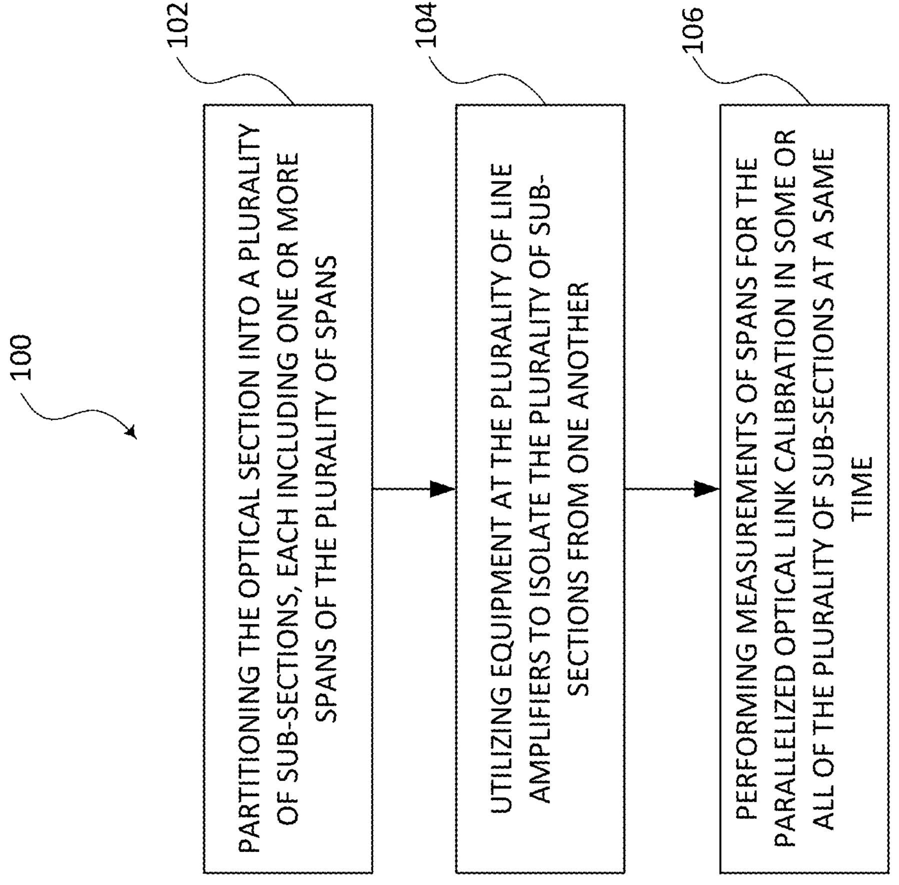
FIG. 8 is a flowchart of a parallelized optical link calibration process.

FIG. 8 is a flowchart of a parallelized optical link calibration process 100. The parallelized optical link calibration process 100 is for an optical section having a plurality of spans interconnecting a transmit Optical Add/Drop Multiplexer (OADM) with a receive OADM via a plurality of line amplifiers. For example, the parallelized optical link calibration process 100 can be implemented with the optical line systems 10, 50.

The parallelized optical link calibration process 100 includes partitioning the optical section into a plurality of sub-sections, each including one or more spans of the plurality of spans (step 102); utilizing equipment at the plurality of line amplifiers to isolate the plurality of sub-sections from one another (step 104); and performing measurements of spans for the parallelized optical link calibration in some or all of the plurality of sub-sections at a same time (step 106).

The performing measurements of spans can include measuring each span in the plurality of sub-sections in steps, such that an overall time to complete the parallelized optical link calibration is independent of a number of the plurality of spans. Also, the performing measurements are isolated in associated sub-sections without impacting other sub-sections. The equipment at the plurality of line amplifiers to isolate the plurality of sub-sections can include a Variable Optical Attenuator (VOA). Alternatively, the equipment at the plurality of line amplifiers to isolate the plurality of sub-sections can include an Erbium Doped Fiber Amplifier (EDFA) which is configured to perform isolation.

The performing measurements can include generating amplified spontaneous emission (ASE) in a current sub-section or in an upstream sub-section and measuring received ASE in the current sub-section. The generating ASE can be one of an Erbium Doped Fiber Amplifier (EDFA), a semiconductor optical amplifier (SOA), or a Raman amplifier. The generating ASE can be via a first line amplifier having a first Erbium Doped Fiber Amplifier (EDFA) configured to create full-band ASE and a second line amplifier having a second EDFA configured to launch the full-band ASE at a specified power. The generating ASE can include full-band ASE for calibration of Raman amplifier gain, i.e., full-based ASE without a specific shape requirement.

The generating ASE can include generating the ASE and spectrally shaping the ASE via a waveshaping device for the measurements being fiber characterization where, at an end of the current sub-section, an Optical Channel Monitor (OCM) is configured to detect a change in the ASE's shape. The measuring can be via one of a Raman amplifier and an Optical Channel Monitor (OCM).

In another embodiment, an optical line system includes a transmit Optical Add/Drop Multiplexer (OADM) including a booster amplifier; a receive OADM including a preamplifier; and a plurality of line amplifiers located between the transmit OADM and the receive OADM, each of line amplifier of the plurality of line amplifiers includes an Erbium Doped Fiber Amplifier (EDFA); wherein the transmit OADM, the plurality of line amplifiers, and the receive OADM form an optical section having a plurality of spans, and wherein the transmit OADM, the plurality of line amplifiers, and the receive OADM are partitioned in a plurality of sub-sections each including one or more spans of the plurality of spans for parallelized optical link calibration that includes utilization of equipment at the plurality of line amplifiers to isolate the plurality of sub-sections from one another, and measurements of spans for the parallelized optical link calibration in some or all of the plurality of the plurality of sub-sections at a same time.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method of parallelized optical link calibration of an optical section having a plurality of spans interconnecting a transmit Optical Add/Drop Multiplexer (OADM) with a receive OADM via a plurality of line amplifiers, the method comprising steps of:

partitioning the optical section into a plurality of sub-sections, each including one or more spans of the plurality of spans;

utilizing equipment at the plurality of line amplifiers to isolate the plurality of sub-sections from one another by terminating optical signals propagating between adjacent sub-sections of the plurality of sub-sections;

generating, at one or more line amplifiers of the plurality of line amplifiers, a new independent calibration signal within each of two or more sub-sections of the plurality of sub-sections; and performing measurements of spans for the parallelized optical link calibration in the two or more sub-sections of the plurality of sub-sections at a same time.

2. The method of claim 1, wherein the two or more sub-sections comprise a first sub-section and a second sub-section having at least one intermediate sub-section of the plurality of sub-sections disposed therebetween, and wherein the at least one intermediate sub-section is isolated from optical power propagation during the performing measurements in the first sub-section and the second sub-section at the same time.

3. The method of claim 1, wherein the performing measurements are isolated in associated sub-sections without impacting other sub-sections.

4. The method of claim 1, wherein the equipment at the plurality of line amplifiers to isolate the plurality of sub-sections includes a Variable Optical Attenuator (VOA) and/or an Erbium Doped Fiber Amplifier (EDFA) which is configured to perform isolation.

5. The method of claim 1, wherein the performing measurements includes generating amplified spontaneous emission (ASE) in a current sub-section or in an upstream sub-section and measuring received ASE in the current sub-section.

6. The method of claim 5, wherein the generating ASE is via one of an Erbium Doped Fiber Amplifier (EDFA), a semiconductor optical amplifier (SOA), or a Raman amplifier.

7. The method of claim 5, wherein the generating ASE is via a first line amplifier having a first amplifier configured to create full-band ASE and a second line amplifier having a second amplifier configured to launch the full-band ASE at a specified power and tilt.

8. The method of claim 5, wherein the generating ASE includes full-band ASE for calibrations using full-band ASE without a specific shape requirement.

9. The method of claim 5, wherein the generating ASE includes generating the ASE and spectrally shaping the ASE via a waveshaping device for calibrations with specific spectral shape requirements where, at an end of the current sub-section, an Optical Channel Monitor (OCM) is configured to detect a change in the ASE's shape.

10. The method of claim 5, wherein the measuring is via one of a Raman amplifier and an Optical Channel Monitor (OCM).

11. An optical line system comprising:

a transmit Optical Add/Drop Multiplexer (OADM);

a receive OADM; and a plurality of line amplifiers located between the transmit OADM and the receive OADM, each of line amplifier of the plurality of line amplifiers including an optical amplifier;

wherein the transmit OADM, the plurality of line amplifiers, and the receive OADM form an optical section having a plurality of spans, and wherein the transmit OADM, the plurality of line amplifiers, and the receive OADM are partitioned in a plurality of sub-sections each including one or more spans of the plurality of spans for parallelized optical link calibration that includes utilization of equipment at the plurality of line amplifiers to isolate the plurality of sub-sections from one another by terminating optical signals propagating between adjacent sub-sections of the plurality of sub-sections, generation, at one or more line amplifiers of the plurality of line amplifiers, of a new independent calibration signal within each of two or more sub-sections of the plurality of sub-sections, and measurements of spans for the parallelized optical link calibration in the two or more sub-sections of the plurality of sub-sections at a same time using the respective new independent calibration signals.

12. The optical line system of claim 11, wherein the two or more sub-sections comprise a first sub-section and a second sub-section having at least one intermediate sub-section of the plurality of sub-sections disposed therebetween, and wherein the at least one intermediate sub-section is isolated from optical power propagation during the measurements in the first sub-section and the second sub-section at the same time.

13. The optical line system of claim 11, wherein the measurements of spans include measuring each span in a sub-set of selected sub-sections without impacting other sub-sections.

14. The optical line system of claim 11, wherein the equipment at the plurality of line amplifiers to isolate the plurality of sub-sections includes a Variable Optical Attenuator (VOA) and/or an Erbium Doped Fiber Amplifier (EDFA) which is configured to perform isolation.

15. The optical line system of claim 11, wherein the measurements include generating amplified spontaneous emission (ASE) in a current sub-section or in an upstream sub-section and measuring received ASE in the current sub-section.

16. The optical line system of claim 15, wherein the generating ASE is via one of an Erbium Doped Fiber Amplifier (EDFA), semiconductor optical amplifier (SOA), or Raman amplifier.

17. The optical line system of claim 15, wherein the generating ASE is via a first line amplifier having a first optical amplifier configured to create full-band ASE and a second line amplifier having a second optical amplifier configured to launch the full-band ASE at a specified power and tilt.

18. The optical line system of claim 15, wherein the generating ASE includes full-band ASE for calibrations using full-band ASE without a specific shape requirement.

19. The optical line system of claim 15, wherein the generating ASE includes generating the ASE and spectrally shaping the ASE via a waveshaping device for the calibrations with specified shaped ASE as source signals where, at an end of the current sub-section, an Optical Channel Monitor (OCM) is configured to detect a change in the ASE's shape.

20. The optical line system of claim 15, wherein the measuring is via one of a Raman amplifier and an Optical Channel Monitor (OCM).

* * * * *